(12) United States Patent
Ardoint et al.

(10) Patent No.: US 8,943,003 B2
(45) Date of Patent: *Jan. 27, 2015

(54) COMPOSITE PRODUCTION RULES

(75) Inventors: Jean Louis Ardoint, Gentilly (FR);
Phillipe Bonnard, Gentilly (FR);
Hugues Citeau, Gentilly (FR)

(73) Assignee: International Business Machines Corporation, Armonk, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 13/463,519

(22) Filed: May 3, 2012

(65) Prior Publication Data

US 2013/0103632 A1 Apr. 25, 2013

Related U.S. Application Data

(63) Continuation of application No. 13/281,037, filed on Oct. 25, 2011.

(30) Foreign Application Priority Data

Oct. 21, 2011 (EP) .................................... 11306365

(51) Int. Cl.
G06N 5/04 (2006.01)
G06Q 10/00 (2012.01)
G06F 15/18 (2006.01)

(52) U.S. Cl.
CPC *G06N 5/46* (2013.01); *G06F 15/18* (2013.01); *G06Q 10/00* (2013.01)

USPC .......................................................... 706/12

(58) Field of Classification Search
None
See application file for complete search history.

(56) References Cited

U.S. PATENT DOCUMENTS

| 4,849,905 A | 7/1989 | Loeb et al. |
| 5,276,776 A | 1/1994 | Grady et al. |

(Continued)

OTHER PUBLICATIONS

U.S. Patent and Trademark Office, U.S. Appl. No. 13/281,037 Non-Final Office Action dated May 2, 2014, pp. 1-29.

(Continued)

*Primary Examiner* — Jeffrey A Gaffin
*Assistant Examiner* — Mikayla Chubb
(74) *Attorney, Agent, or Firm* — Charles L. Moore; Moore & Van Allen PLLC

(57) ABSTRACT

A method for forming and using a composite production rule may include compiling, by a computer system, a decision table or a decision tree to generate a composite production rule. The method may also include generating the composite production rule and selecting, by the computer system, an algorithm for compiling the composite production rule. The method may additionally include compiling, by the computer system, the composite production rule into an executable program based on pattern matching of the selected algorithm. The method may further include executing, by the computer system, the composite production rule to provide an output based on the composite production rule.

14 Claims, 11 Drawing Sheets

(56) References Cited

U.S. PATENT DOCUMENTS

| | | |
|---|---|---|
| 7,020,869 B2 | 3/2006 | Abrari et al. |
| 7,562,340 B2 | 7/2009 | Kosov et al. |
| 7,809,666 B2 | 10/2010 | Citeau |
| 8,352,402 B2 | 1/2013 | Tirelli |
| 2003/0229605 A1 | 12/2003 | Herrera |
| 2004/0215593 A1 | 10/2004 | Sharangpani |
| 2006/0173698 A1 | 8/2006 | Morley |
| 2008/0097748 A1 | 4/2008 | Haley et al. |
| 2009/0055343 A1 | 2/2009 | Van Lunteren |
| 2009/0063382 A1 | 3/2009 | Proctor |
| 2009/0228421 A1 | 9/2009 | Citeau |
| 2010/0238929 A1 | 9/2010 | Hsu |
| 2011/0246407 A1 | 10/2011 | Lee |

OTHER PUBLICATIONS

Forgy, Charles, L., Rete: A Fast algorithm for the Many Patter/Many Object Pattern Match Problem, Artificial Intelligence, vol. 27, pp. 324-341, 1985.

Quinlan, J.R., Generating Production Rules form Decision Trees, Knowledge Acquisition, pp. 304-307, No Date.

Oracle Haley, An Oracle White Paper, Linear Inferencing: High-Performance Processing, Feb. 2009, pp. 1-4.

Wikipedia, Business Rules Approach, http://en.wikipedia.org/wiki/Business_rules_approach, pp. 1-3, dated Dec. 1, 2010.

IBM—Websphere ILog JRules, Develop and Deploy powerful rule-based applications, http://www-01.ibm.com/software/ integration/business-rule-management/jru..., 3 pgs., Aug. 27, 2011.

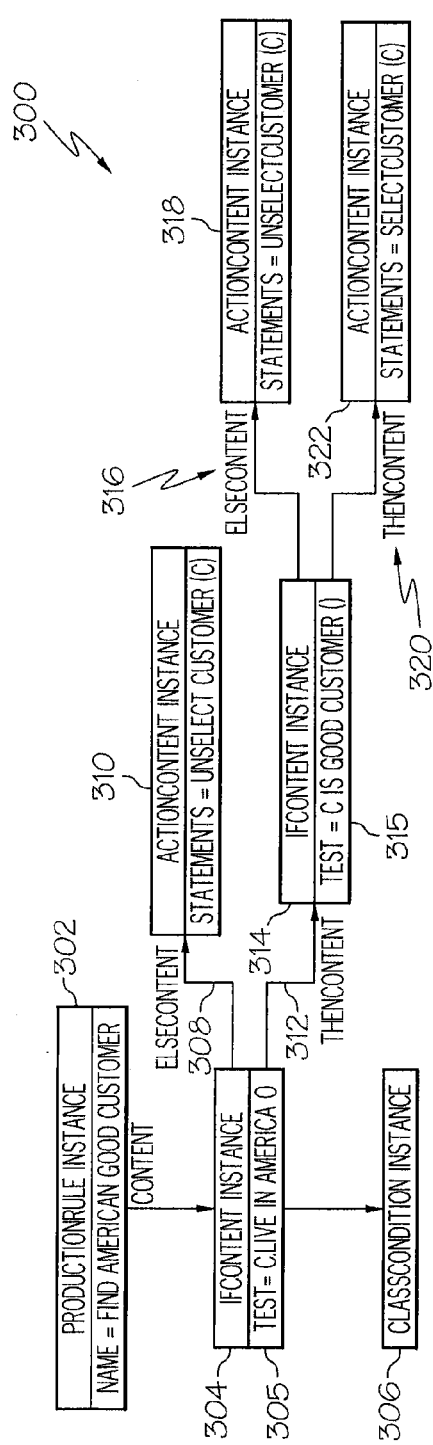
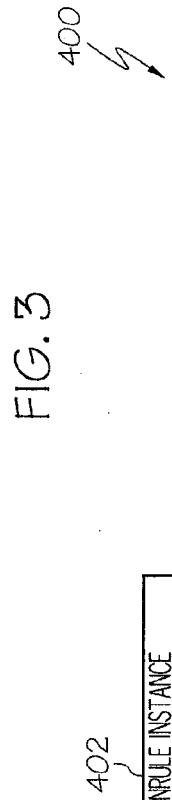
FIG. 3
FIG. 4

COMPOSITE PRODUCTION RULES

CROSS-REFERENCE TO RELATED APPLICATION

This application is a continuation application of U.S. patent application Ser. No. 13/281,037, filed Oct. 25, 2011, which claims benefit of priority to European Application No. 11306365.5 filed on Oct. 21, 2011, the contents of which are hereby incorporated by reference herein in their entirety.

BACKGROUND

Aspects of the present invention relate to business rules for representing and evaluating decision tables and decision trees, and more particularly to a method, system and computer program product for forming composite production rules for representing and evaluating decision tables and decision trees.

A regular production rule is composed of a condition part, also known as the left hand-side, defining the pattern matching portion of the rule, and an action part, also known as the right hand-side, which is the action to be taken in response to the condition being satisfied. In different rule systems, the production rules have been augmented with an else part. One example of augmented production rules is IBM WebSphere ILOG Jrules 4.5. IBM, WebSphere and ILOG are trademarks of International Business Machines Corporation in the United States, other countries or both. In this version of Jrules, the else action part is executed if the last Boolean condition was evaluated to be false. As new business artifacts such as decision rules tables and decision trees are becoming more commonly used in the Business Rule Management System (BRMS) environment, the standard condition/action paradigm of common production rules is not capable of representing such business artifacts. Previous production rules, such as JRules and similar BRMS tools require that decision tables or trees be represented by several different and separate production rules. Moreover a separate production rule may be required for each line of a table. This representation leads to complex compilation in order to enhance the execution performance of the multiplicity of production rules. Further, as decision tables and trees are becoming much more commonly and widely used in industrial applications, the size of such decision tables and trees are becoming quite substantial which can result in scalability challenges and performance limitations.

BRIEF SUMMARY

According to an aspect of the present invention, a condition part of a production rule may be extended with complex procedural instructions such as an if/then/else instruction or statement, a switch statement, or a match statement to define a composite production rule. The extension defines complex activation strategies of rules that may appear in decision tables, decision trees or other business management mechanisms. Forming or generating these composite production rules with the complex activation structures in the condition part of the rules makes these composite production rules simpler to compile and to efficiently evaluate at runtime.

According to another aspect of the present invention, a method for forming and using a composite production rule may include compiling, by a computer system, a decision table or a decision tree to generate a composite production rule. The method may also include generating the composite production rule and selecting, by the computer system, an algorithm for compiling the composite production rule. The method may additionally include compiling, by the computer system, the composite production rule into an executable program based on pattern matching of the selected algorithm. The method may further include executing, by the computer system, the composite production rule to provide an output based on the composite production rule.

According to another aspect of the present invention, a system for forming and using a composite production rule may include a processing device and a compiler in the processing device for compiling a decision table or a decision tree to generate a composite production rule. The system may also include a module in the processing device for selecting an algorithm for compiling the composite production rule into an executable program based on pattern matching of the selected algorithm to provide an output. The system may additionally include an output device to present the output from executing the compiled composite production rule.

According to a further aspect of the present invention, a computer program product for forming and generating a composite production rule may include a computer readable storage medium having computer readable program code embodied therewith. The computer readable program code may include computer readable program code configured to compile a decision table or a decision tree to generate a composite production rule. The computer readable program code may additionally include computer readable program code configured to select an algorithm for compiling the composite production rule. The computer readable program code may further include computer readable program code configured to compile the composite production rule into an executable program based on pattern matching of the selected algorithm. The computer readable program code may also include computer readable program code configured to execute the composite production rule to provide an output based on the composite production rule.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is a representation of an example of an if/then/else content type composite production rule in accordance with an embodiment of the present invention.

FIG. 4 is a representation of an example of a switch content type composite production rule in accordance with an embodiment of the present invention.

DETAILED DESCRIPTION

Figure 1:
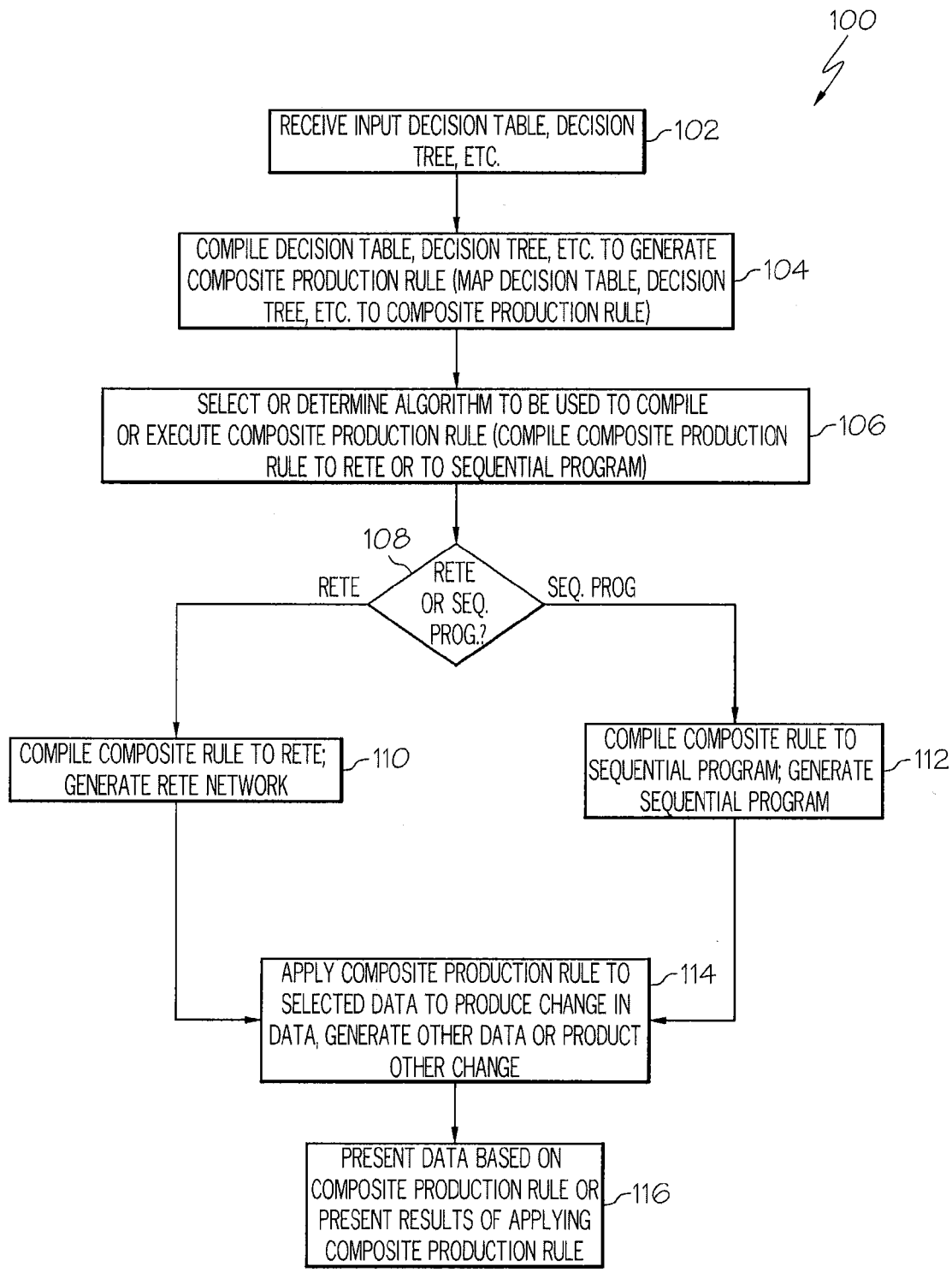
FIG. 1 is a flowchart of an example of a method for forming and using a composite production rule to evaluate data and present results of the evaluation in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for forming and using a composite production rule to evaluate data and present results of the evaluation in accordance with an embodiment of the present invention. In block 102, an input decision table, input decision tree or other business decision management mechanism may be received. As used herein a decision table or decision tree may be any type or form of decision management mechanism or decision logic tool that may be represented in the form of a composite production rule as described herein.

In block 104, the decision table, decision tree or the like may be compiled to generate a composite production rule. The composite production rule may be generated by mapping or translating the decision table, decision tree or other mechanism to a composite production rule model. An example of a composite production rule model will be described with reference to FIG. 2. The decision table or tree may be compiled by mapping or translating to a single composite production rule while maintaining a logical structure of the decision table or tree. Examples of compiling a decision table or tree and examples of generating or forming the single composite production rule will be described with reference to FIGS. 2-8.

In block 106, an algorithm may be selected or determined that may be used to compile or execute the composite production rule. The composite production rule may be compiled into an executable program depending on the pattern matching of the algorithm selected to compile the composite production rule. The composite production rule may be compiled on a Rete network using a Rete algorithm or to a sequential program. A Rete-based expert system builds a network of nodes, where each node (except a root node) corresponds to a pattern occurring in the left-hand-side (the condition part) of a rule. The path from the root node to a leaf node defines a complete rule left-hand-side. Each node has a memory of facts which satisfy that pattern. This structure is essentially a generalized trie. As new facts are asserted or modified, they propagate along the network, causing nodes to be annotated when a fact matches that pattern. When a fact or combination of facts causes all of the patterns for a given rule to be satisfied, a leaf node is reached and the corresponding rule is triggered. The Rete algorithm provides a generalized logical description of an implementation of functionality responsible for matching data tuples ("facts") against productions ("rules") in a pattern-matching production system (a category of rule engine). A production consists of one or more conditions and a set of actions which may be undertaken for each complete set of facts that match the conditions. Conditions test fact attributes, including the fact type specifiers/identifiers. The Rete algorithm reduces or eliminates certain types of redundancy through the use of node sharing. The Rete algorithm also stores partial matches when performing joins between different fact types. This, in turn, allows production systems to avoid complete re-evaluation of all facts each time changes are made to the production system's working memory. Accordingly, the production system needs only to evaluate the changes to the working memory. The Rete algorithm also allows for efficient removal of memory elements when facts are retracted from the working memory. The Rete algorithm is described in more detail in "Expert Systems: A Software Methodology for Modern Applications," pages 324-341. IEEE Computer Society Press, Los Alamitos, Calif., USA, 1990.

In block 108, a determination is made whether the algorithm selected is for compiling the composite production rule on the Rete network or to a sequential program. The algorithm may be selected by the user or by some other mechanism. If the algorithm selected is for compiling the composite production rule on the Rete network, the method 100 may advance to block 110. In block 110, the composite production rule is evaluated using the Rete algorithm and the production rule is compiled on a Rete network. An example of evaluating the composite production rule using the Rete algorithm and compiling the rule on a Rete network will be described in more detail with reference to FIGS. 9 and 10.

If the algorithm selected in block 108 is for compiling the composite production rule to a sequential program, the method 100 may advance to block 112. In block 112, the composite production rule is compiled to generate a sequential program for executing the composite production rule. An example of compiling a composite production rule to a sequential program is described and claimed in U.S. Pat. No. 7,809,666, entitled "Method and System for Sequential Compilation and Execution of Rules," filed Dec. 7, 2006, which is assigned to the same assignee as the present application and is incorporated herein in its entirety by reference.

In block 114, the composite production rule may be applied to selected data to produce a change in the data, generate other data or to produce some other change or side effect. In block 116, the results of applying the composite production rule may be presented or the data obtained based on the composite production rule may be presented by an output device.

Figure 2:
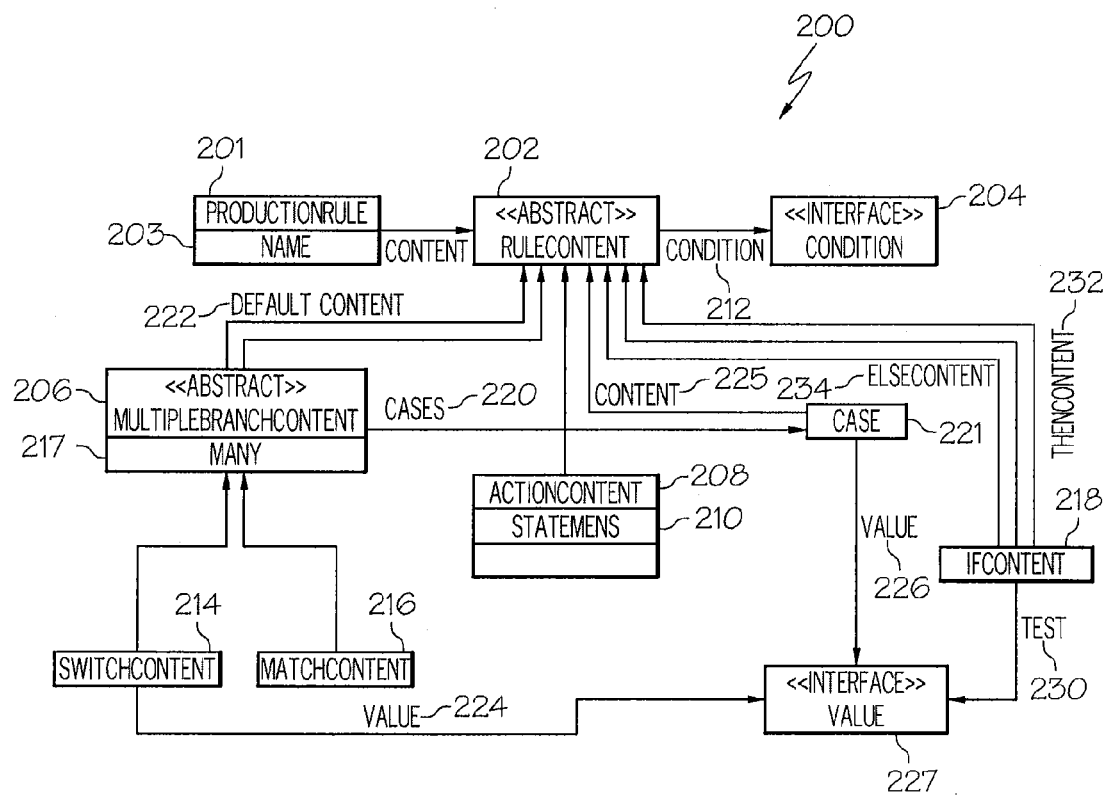
FIG. 2 is a representation of an example of a composite production rule model in accordance with an embodiment of the present invention.

FIG. 2 is a representation of an example of a composite production rule model 200 in accordance with an embodiment of the present invention. The composite production rule model 200 may include a ProductionRule class 201 that has a name 203. A composite production rule 201 may also include a rule content 202. The content 202 of the composite production rule 201 may be a complex and recursive mixing of a condition part 204, (switch and match in a composite rule are declarative and not procedural instructions) multiple branch content 206 which may take different forms as described in more detail herein, or an action content 208. The condition part 204 may include matching variables which are defined. The action content 208 may include a plurality of action statements 210 and a condition 212 as inherited from the rule content. At least one of the plurality of action statements 210 is performed in response to the condition 212 being satisfied in a predetermined way.

A composite production rule 201 may contain different kinds of rule content 202. The different kinds of rule content may be a switch content 214, a match content 216, an if/then/else content 218 or other similar type content.

The switch content 214 may include one or more cases 220 of the Case class 221, an optional default content 222 and a switch value 224. The case content includes a constant value 226 of the Value class 227 and may include a sub-content 225 (the sub-content is represented as a link in the diagram) similar to that described with reference to FIG. 4. A switch content 214 contains a switch value 224. The switch value is evaluated when the composite rule is applied to some data. The switch content 214 extends the a multi-branch content 206 including a plurality of cases 220 of Case class 221 and corresponding values 226 and sub-contents 225 (the link to content). The content corresponding to the case 220 that matches the switch value 224 may be selected for execution.

The switch content 214 may operate in a "many switch mode" as indicated by the many attribute 217 in response to a plurality of case contents 220 including overlapping constant values 226 of the Value class 227. The result of the switch value 224 evaluation permits to select the set of cases that are to be applied. Without the 'many switch mode', only the first case that matches the switch value is applied.

The match content 216 may include a list of match cases 220 and an optional default content 222, as inherited from the MultipleBranchContent class 206. Each match case 220 may include a sub-content 225 (the link named "content", not the box in the diagram) and a corresponding match predicate, a value that can be evaluated as true or false 226. The sub-content 225 of one of the list of match cases 220 is selected in response to the corresponding match predicate 226 being satisfied. The optional default content 222 is selected in response to none of the match predicates 226 for each of the list of match cases 220 being satisfied. The match content 216 may also operate in a "many match mode" as indicated by the many attribute 217. In this case, for each value 226 in a case 220 which is evaluated to true, the corresponding content 225 from the case 220 is applied. Without the 'many evaluate mode', only the first case 220 which value 226 is evaluated to true is applied. Each sub-content 225 of the list of match cases 220 may be selected in response to the corresponding match predicate 221 being satisfied in the many match mode of operation.

The if/then/else content 218 includes a test 230 (which is represented by a link named "test" in the diagram), a then content portion 232 and an else content portion 234 (which are both represented as links in the diagram). The test 230 can be evaluated to true or false. The then content portion 232 is selected in response to the test 230 being true. The else content portion 234 is selected in response to the test 230 being false.

Composite production rules may be expressed using a dedicated technical syntax. The following examples illustrate such a syntax.

FIG. 3 is a representation of an example of an if/then/else content type composite production rule 300 in accordance with an embodiment of the present invention. The exemplary if/then/else content type composition production rule 300 is representative of the following composite production rule for selecting good customers living in America:

```
rule findAmericanGoodCustomer {
    when {
        c: Customer( );
    }
    if (c.liveInAmerica( )) {
        if (c.isGoodCustomer( )) {
            selectCustomer(c);
        } else {
            unselectCustomer(c);
        }
    } else {
        unselectCustomer(c);
    }
}
```

The ProductionRule instance 302 of the composite production rule representation 300 may include "name=findAmericanGoodCustomer." In this example name=findAmericanGoodCustomer corresponds to the ProductionRule name 201 in FIG. 2. A IfContent instance 304 or portion of the composite production rule may include the value or predicate expression "test=c.LiveInAmerica( )" 305. For each object satisfying the class condition instance 306, the test 305 may be evaluated. If the test 305 is evaluated as true, the thenContent 312 is selected, otherwise, the elseContent 308 is selected. When the thenContent 312 is selected, the test 315 of the IfContent 314 is evaluated. If the test 315 is evaluated to true, the thenContent 320 is selected, leading to execution of the statements of the ActionContent 302. If the test 315 is evaluated to false, the elseContent 316 is selected, leading to the execution of the statements of the ActionContent 318. If the test 305 is evaluated to false, the elseContent 308 is selected, leading to the execution of the statements in the ActionContent 310.

The predicate expression 305 may be evaluated to determine if the IfContent instance 304 is satisfied. The IfContent instance 304 may be associated with a ClassCondition instance 306. When the IfContent instance 304 or predicated expression 305 is evaluated based on the ClassCondition instance 306, an "elseContent" branch 308 may be taken to ActionContent instance 308 in response to the IfContent instance 304, "test=c.LiveInAmerica( )" or predicate expression 305 being false. The ActionContent instance 310 may include "statements=unselectCustomer(c)." If the IfContent instance 304 or predicate expression 305 is evaluated as being true, a "thenContent" branch 312 may be taken to another IfContent instance 314 or then content portion of the composite production rule 300. The IfContent instance 314 may include the content or predicate expression "test=c.isGoodCustomer( )" 315. When the IfContent instance 314 or predicate expression 315 is evaluated, an "elseContent" branch 316 may be taken to ActionContent instance 318 or another else content portion in response to the IfContent instance 314 "test=c.isGoodCustomer( )" or predicate expression 315 being false. ActionContent instance 318 may include the content "statements=unselectCustomer(c.)." If the IfContent instance 314 or predicate expression 315 is true, a "thenContent" branch 320 may be taken to ActionContent instance 322 or another then content portion. The ActionContent instance 322 may include "statements=selectCustomer(c.)."

FIG. 4 is a representation of an example of a switch content type composite production rule 400 in accordance with an embodiment of the present invention. The exemplary switch content type composite production rule 400 is representative of the following composite production rule for processing customers depending on their age:

```
rule processCustomerFromAge {
    when {
        c: Customer( );
    }
    switch (c.getAge( )) {
        case [18,30[:
            processYoungAdult(c);
        case [30, 55]:
            processMatureAdult(c);
        default:
            processSeniorAdult(c);
    }
}
```

The exemplary switch type composite production rule 400 may include a ProductionRule instance 402 including the contents "name=processCustomerFromAge." A SwitchContent instance 404 of the composite production rule 400 may include the content "many=false" and "value=c.getAge ( )." The SwitchContent instance 404 may include with a ClassCondition instance 406. The switch type composite production rule 400 may include one or more Case instances 408 and 410 and an optional default content, ActionContent instance 412. In the exemplary switch type composite production rule presented above and represented graphically in FIG. 4, Case instance 408 may include the content "value=[30, 50]" and Case instance 410 may include the content "value=[18, 30]." The default Action Content instance 412 may include the content "statements=unselectCustomer(c.)." Each of the Case instances 408 and 410 may include with an ActionContent instance 414 and 416, respectively, which may also be referred to as sub-contents. Depending upon evaluation of a switch value 418 associated with the SwitchContent instance 404 one of the Case instances 408 and 410 may be selected and the corresponding ActionContent instance 414 or 416 statement may be selected and the specified action performed. In the exemplary switch type composite production rule above and as graphically illustrated in FIG. 4, the Case instance 408 may be selected in response to an evaluation of the switch value 418 being an age value between 30 and 55. The case instance 410 may be selected in response to an evaluation of the switch value 418 being an age value between 19 and 30 and the default ActionContent instance 412 may be selected in response to evaluation of the switch value 418 not being satisfied by any of the values of the Case instances 408 and 410. ActionContent instance 414 may be selected in response to Case Instance 408 satisfying the switch value of switch value module 418. ActionContent instance 414 may include the content "statements=process MatureAdults(c.)." ActionContent instance 416 may be selected in response to Case instance 410 satisfying the switch value of module 418 of SwitchContent instance 404. ActionContent instance 416 may include the content "statements=process Young Adults (c.)."

The SwitchContent instance 404 may also operate in a many switch mode if it contained "many=true" in response to a plurality of the Case instance 408 and 410 contents including overlapping constant values. Each of the sub-content or ActionContent instance 414 and 416 corresponding to each of the plurality of Case instances 408 and 410 including contents that satisfy the switch value 418 may be selected. For example, if both Case instances 408 and 410 included overlapping age values between 30 and 40, then the contents of both ActionContent instances 414 and 416 would be selected in response to the switch value 418 being evaluated to be satisfied for age values between 30 and 40.

Figures 5, 6:
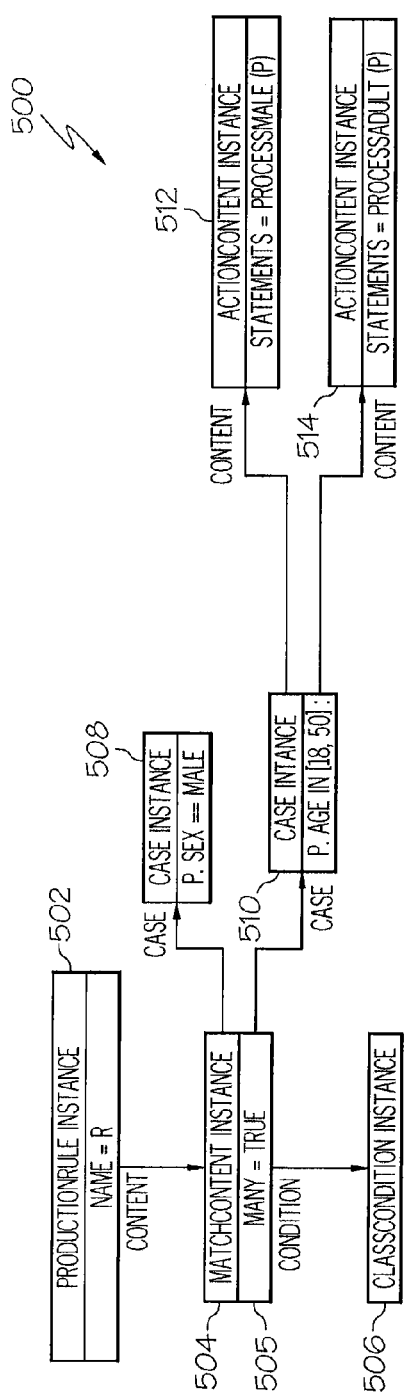
FIG. 5 is a representation of an example of a match content type composite production rule in accordance with an embodiment of the present invention.
FIG. 6 is an example of decision table for mapping on a composite production rule model in accordance with an embodiment of the present invention.

FIG. 5 is a representation of an example of a match content type composite production rule 500 in accordance with an embodiment of the present invention. The exemplary match content type composite production rule 500 is representative of the following composite production rule for processing different persons based on different criteria using a "match" expression:

```
rule R {
  when {
    p:Person ( )
  }
  match many {
    case p.sex == male:
      then Male do {
        processMale(p);
      }
    case p.age in [18,150]:
      then Adult do {
        processAdult(p);
      }
  }
}
```

The match type composite production rule 500 may include a ProductionRule instance 502 that may include the contents "name=R." a MatchContent instance 504 may include contents and a value "many=true" which may indicate that it is executed in many match mode. The MatchContent instance 504 may also include a ClassCondition instance 506. The match composite production rule 500 may also include a list or plurality of match cases such as, Case instances 508 and 510. In the exemplary match composite production rule above and as illustrated in FIG. 5, Case instance 508 includes the value "p.sex==Male" and Case instance 510 includes the value "p.age==in [18,150]." Case instance 508 may include content ActionContent instance 512 which may also be referred to as a sub-content. ActionContent instance 512 may include content or value "statements=processMale (p)." Case instance 510 may include content ActionContent instance 514 which may also be referred to as a sub-content. ActionContent instance 514 may include content or value "statements=processAdult (p)." Case instances 508 and 510 are selected based on an evaluation of the content values of the Case instances 508 and 510. The corresponding Action Content instances 512 and 514 are then performed based on the content values of the Case instances 508 and 510. If none of the list of match cases 508 and 510 is satisfied, then none of the match cases or sub-contents 512 and 514 is selected as a default.

The match content type composite production rule may operate in a not many match mode. The ActionContent 512 and 514 or sub-content for each of the list of match cases 508 and 510 that are satisfied are selected.

FIG. 6 is an example of decision table 600 for mapping or translating on a composite production rule in accordance with an embodiment of the present invention. The exemplary decision table 600 may include a plurality of condition columns 602 and a plurality of corresponding action columns 604. In addition to the columns 602 and 604 the decision table 600 may include a plurality of rows 606. Each row 606 may be mapped or translated to a single production rule with the columns 602 and 604 defining the conditions and corresponding actions of the rules. When the decision table 600 is executed, if the conditions 602 of a given row 606 are met, the actions 604 in that row are performed. While the operator used in a column is usually the same, the operator may be different in different rows. For example, the loan column 608 has different values in different rows. Additionally, there may be overlaps in the condition columns so that the conditions of more than one row may be satisfied.

Figure 7:
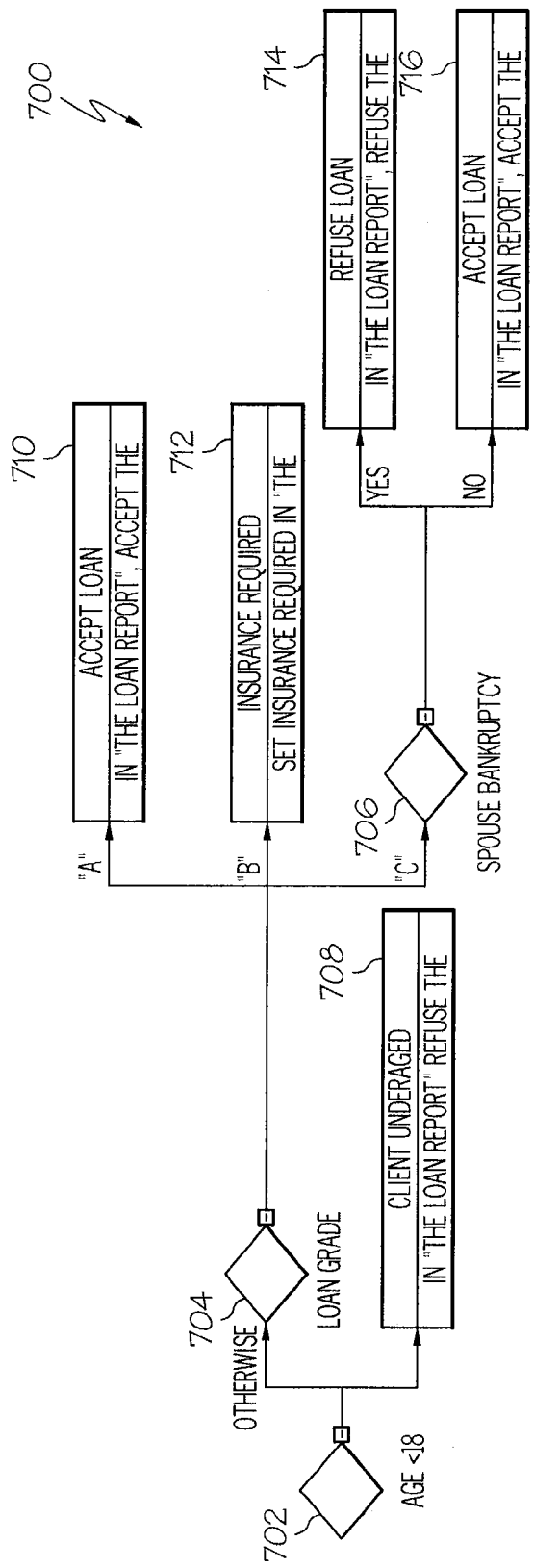
FIG. 7 is an example of a decision tree including non-symmetric decision rules for mapping on a composite production rule in accordance with an embodiment of the present invention.

FIG. 7 is an example of a decision tree 700 including non-symmetric decision rules for mapping on a composite production rule in accordance with an embodiment of the present invention. Large sets of non-symmetrical rules may be easier to understand using a decision tree where the path from the first condition to the end of the actions along any branch can be seen as one rule. The diamond-shaped nodes 702, 704 and 706 each represent a condition. The possible values for the condition are represented by branches from each of the condition nodes 702, 704 and 706. The actions are declared in the terminal nodes 708, 710, 712, 714 and 716 of each branch.

Mapping or translation of a decision tree, such as tree 700, into a composite production rule, similar to composite production rule model 200 in FIG. 2, may be simple and isomorphic. A root switch or node may be mapped onto a switch content, such as switch content 214 in FIG. 2, defined as a root content of the composite production rule. The links or branches from the root node or switch may be mapped as cases 220 of the root switch or node. The optional otherwise link or branch may be mapped as a default case 222 of the switch or node in the composite production rule. By induction, further switch nodes of the decision tree may be mapped onto a switch instruction defined as a sub-content 225 of the case instruction 220. The terminal leaves of the decision tree or the actions may be mapped to corresponding content actions 208 of the rule.

Figure 8:
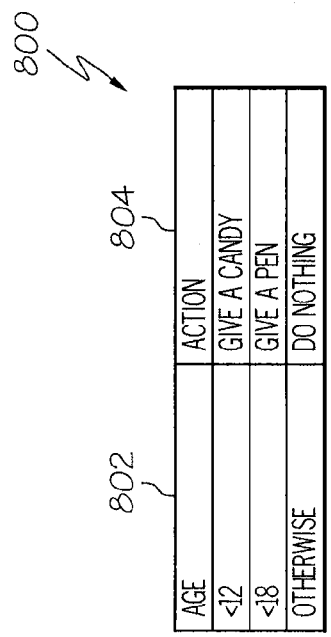
FIG. 8 is an example of decision table including overlapping rules for mapping on a composite production rule in accordance with an embodiment of the present invention.

FIG. 8 is an example of decision table 800 including overlapping rules for mapping on a composite production rule in accordance with an embodiment of the present invention. A decision table with no overlap can be seen as a tree of switch conditions. If there is an overlap, such as illustrated in the age column 802 of the exemplary decision table 800 then many options, such as in Action column 804 may be selected in response to a predetermined condition being satisfied, such as below the age of 12 in decision table 800, give candy and give pen. Two actions are supposed to occur when the age is below 12 in decision table 800. Decision table 800 may be mapped on a composite production rule model, such as model 200 represented in FIG. 2 and be represented by the following composite production rule:

```
rule gift {
    when {
        c: Customer( );
    }
    switch ( c.age ) many {
        case ]-oo, 12[ : {
            give(c, candy);
        }
        case ]-oo, 18[ : {
            give(c, pen);
        }
        default: {
        }
    }
}
```

Figure 9:
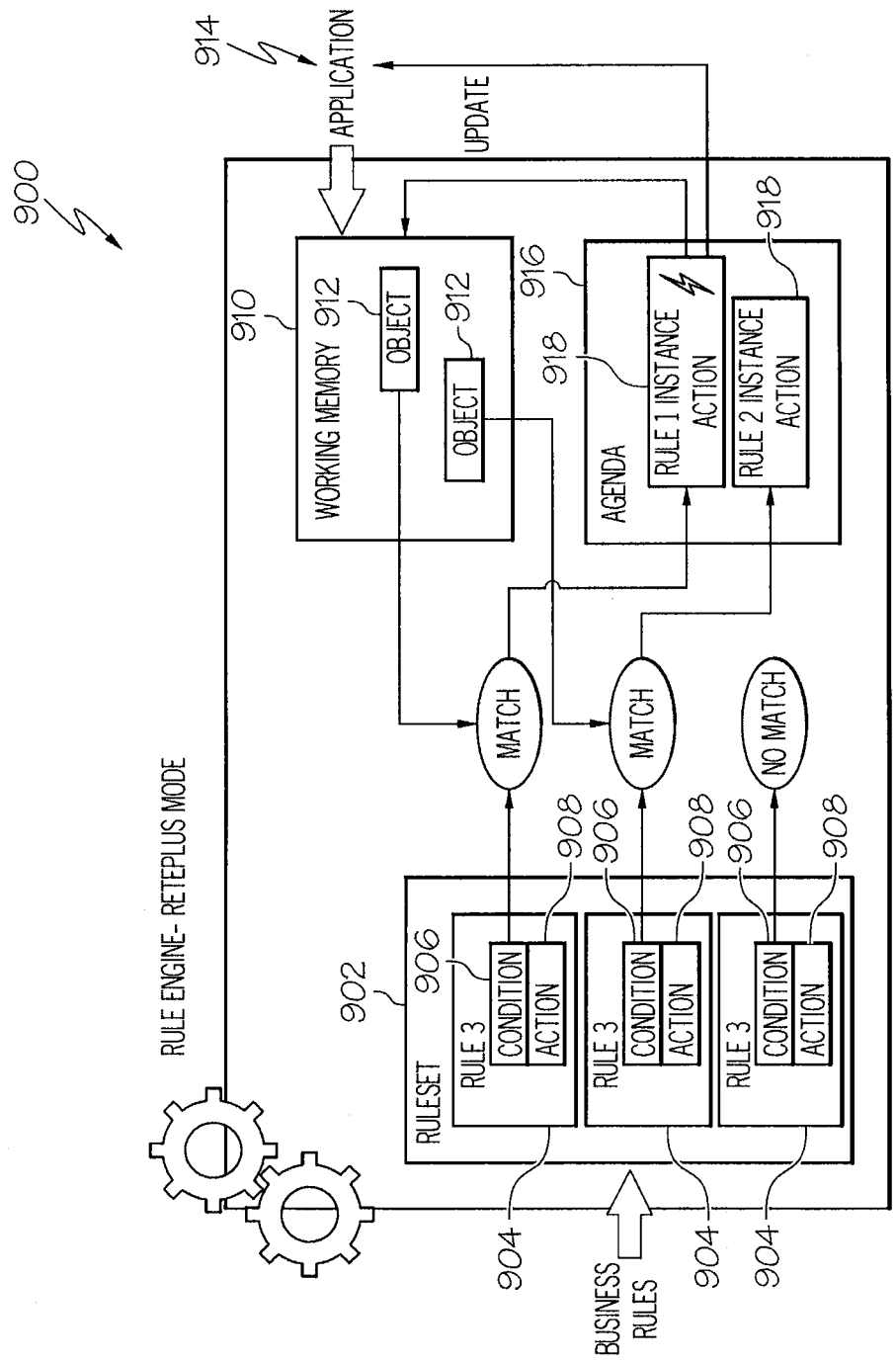
FIG. 9 is a representation of an example of a rule engine for compiling a composite production rule using a Rete algorithm in accordance with an embodiment of the present invention.

FIG. 9 is a representation of an example of a rule engine 900 for compiling a composite production rule using a Rete algorithm in accordance with an embodiment of the present invention. The Rete algorithm performs incremental pattern matching against a set of objects. The Rete algorithm is an efficient pattern matching algorithm for implementing production rule systems. The algorithm is described in *Expert Systems: A Software Methodology for Modern Applications*, by Dr. Charles L. Forgy, pages 324-341. IEEE Computer Society Press, Los Alamitos, Calif., USA, 1990).

The rule engine 900 may include a set of rules or rule set 902. The rule set 902 may receive and store a plurality of business rules 904. Each rule 904 may include a condition 906 and an action 908 which may be performed in response to the condition 906 being met or satisfied. Each rule 904 may also be a composite production rule 200.

The rule engine 900 may also include a working memory 910 for receiving and storing objects 912. The objects 912 are provided by the application 914 or can be created or updated during the execution of the engine 900. The rule engine 900 may additionally include an agenda 916 for storing rule instances 918 generated as described here with reference to FIG. 10.

As an example, the Rete algorithm used in JRules is based on a network composed of nodes. The entry node, named the working memory, contains a whole set of objects to be observed by the rules engine. The working memory is linked to classification nodes, discrimination nodes and join nodes in charge of calculating the satisfying tuples of a sub-expression of the pattern matching expression. The pattern matching expression calculation is refined along the network until reaching ending nodes which may be referred to as rule nodes. The rule nodes contain a list of tuples satisfying the whole pattern of a particular rule. In the present invention, the regular Rete network is extended with new kinds of nodes: branch nodes and case nodes.

Figure 10:
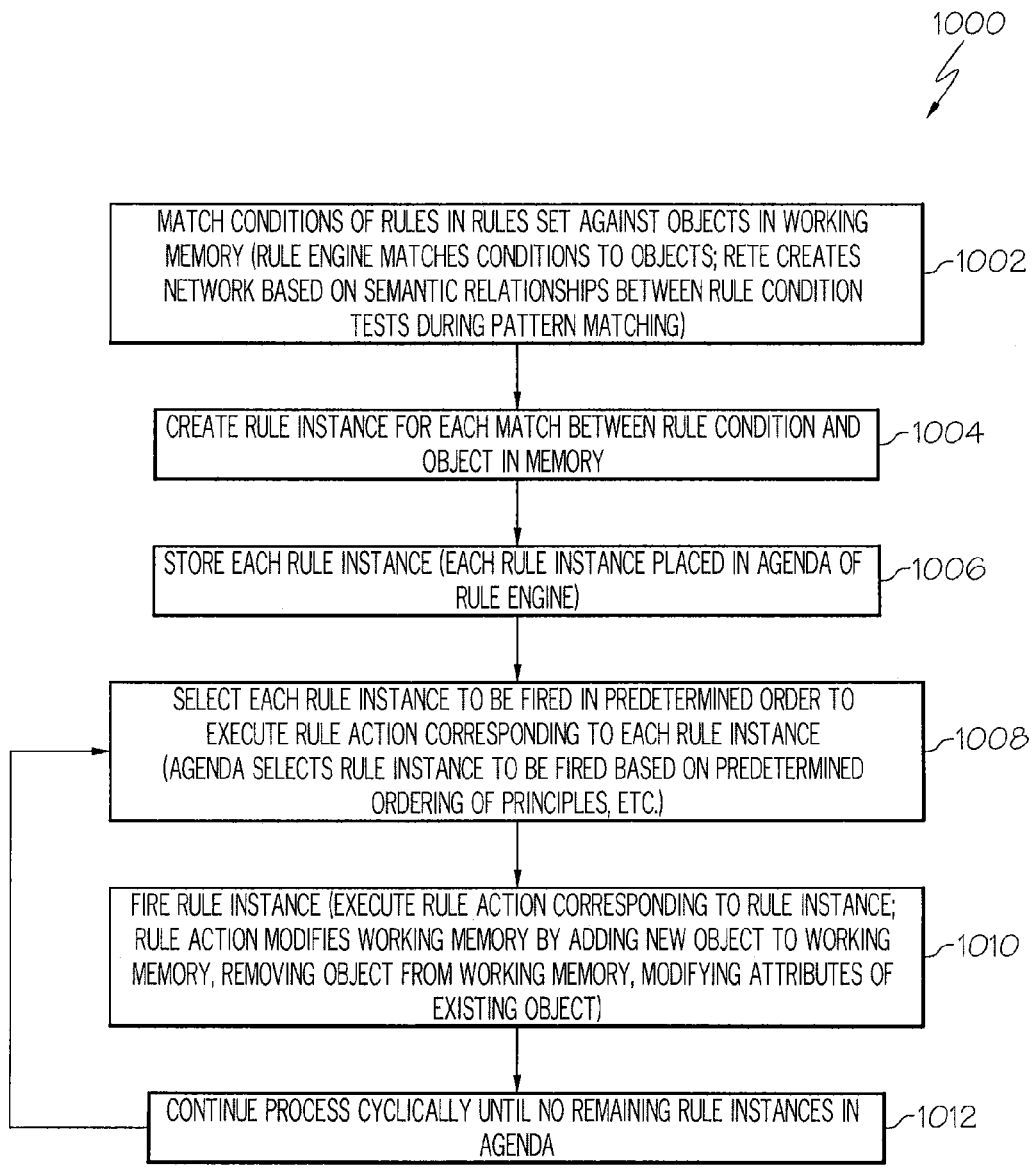
FIG. 10 is a flow chart of an example a method for compiling a composite rule by the rule engine of FIG. 9 in accordance with an embodiment of the present invention.

Referring also to FIG. 10, FIG. 10 is a flow chart of an example a method 1000 for executing a Rete network (this flow chart describes the regular Rete execution, it is not specific to the present invention.). In block 1002, conditions 908 of rules 904 in rule set 902 may be matched against objects 912 in working memory 910. The Rete algorithm creates a network based on semantic relationships between rule condition tests during pattern matching between the conditions 906 and objects 912.

In block 1004, a rule instance 918 may be created for each match between a rule condition 906 and an object 912 in the working memory 910. In block 1006, each rule instance 918 may be stored in the agenda 916 of the rule engine 900.

In block 1008, each rule instance 918 may be selected to be fired or executed in a predetermined order to execute the rule action 908 corresponding to each rule instance 918. The agenda 916 may select the rule instance 918 to be fired based on a predetermined order of principles or by some other mechanism.

In block 1010, the selected rule instance 918 is fired or executed. The rule action 908 corresponding to the rule instance 918 is executed. The rule action 908 when executed may perform one of several operations. The rule action 908 may modify the working memory 910 by adding a new object 912; remove an object 912 from the working memory 910; or modify attributes of an existing object 912.

In block 1012, the process of selecting and firing each rule instance 918 may continue cyclically until no remaining instances 918 are in the agenda 916.

Figure 11:
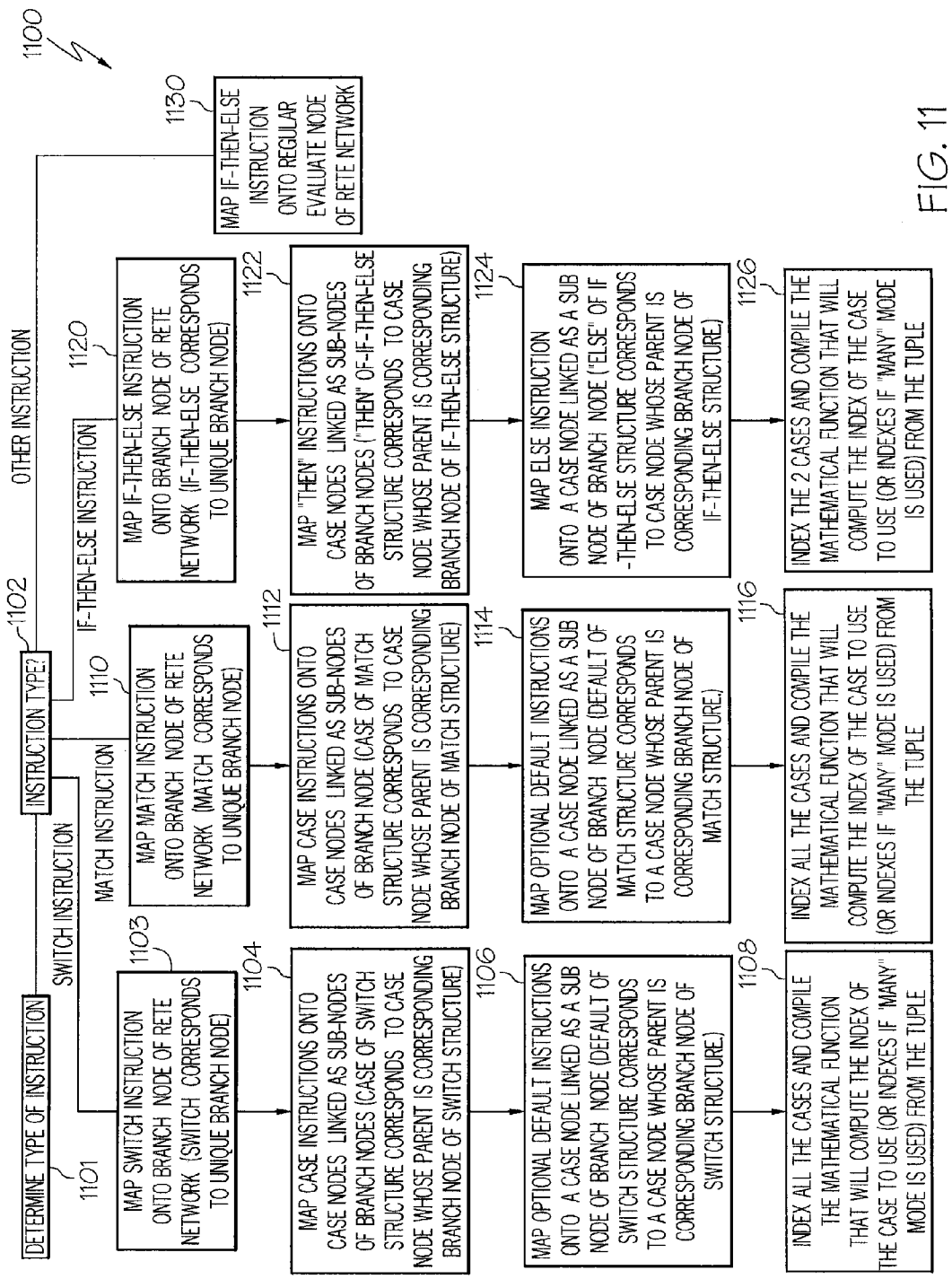
FIG. 11 is a flow chart of an example of a method for compiling a composite rule in accordance with another embodiment of the present invention.
Figure 12:
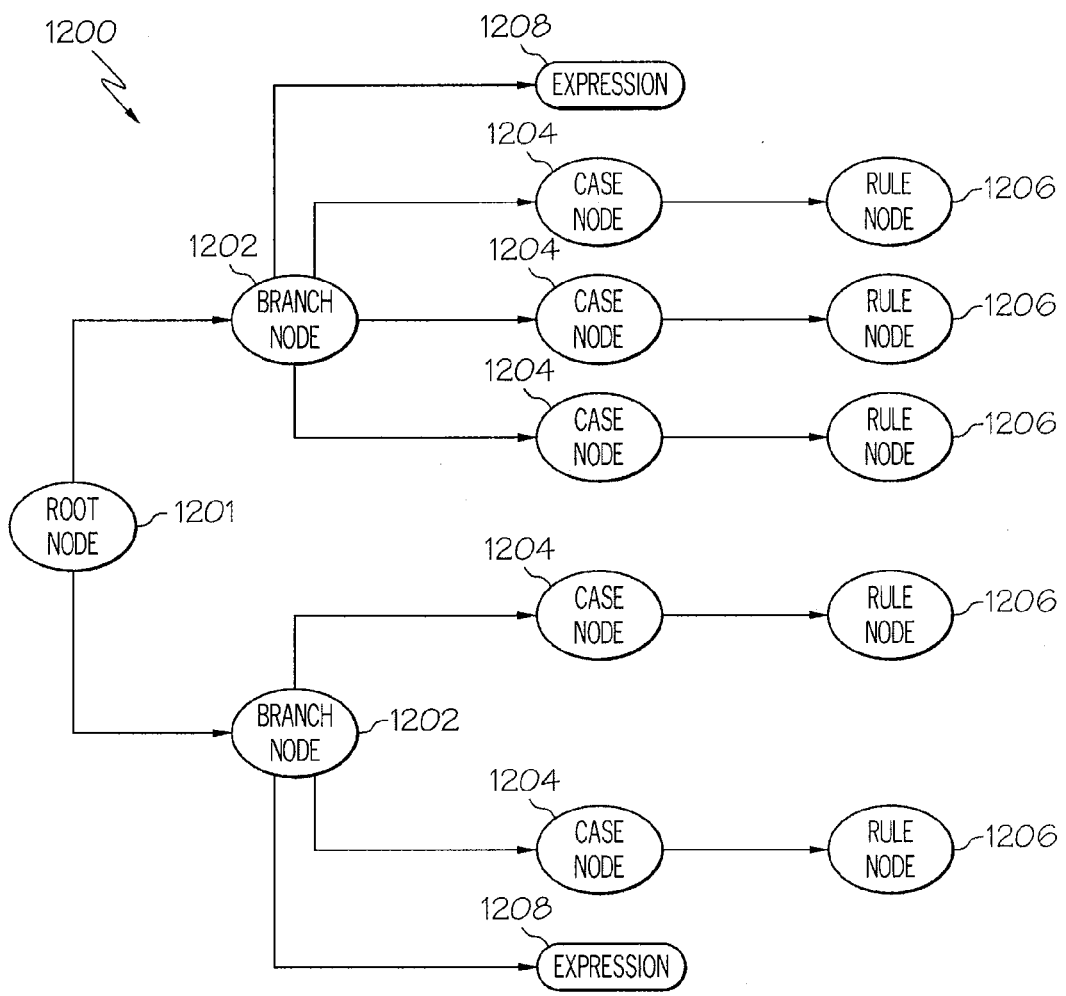
FIG. 12 is a representation of an example of compilation of a composite rule using the exemplary method of FIG. 11 in accordance with an embodiment of the present invention.

FIG. 11 is a flow chart of an example of a method 1100 for compiling a composite rule in accordance with another embodiment of the present invention. Referring also to FIG. 12, FIG. 12 is a representation of an example of compilation of a composite rule in a Rete network 1200 using the exemplary method of FIG. 11 in accordance with an embodiment of the present invention.

In 1101, a choice of compilation is made depending on the kind of instruction that is being used in the rule. If the instruction is a switch (switch 214 in FIG. 2), then block 1103 is chosen to process the instruction. If the instruction is a match (match 216 in FIG. 2), the block 1110 is chosen to process the instruction. If the instruction is an if-then-else (218 in FIG. 2) then the block 1120 is chosen to process the instruction. If the instruction is another kind of instruction (typically an action content 218), then block 1130 is chosen to process it.

In block 1102, a switch instruction may be mapped onto a branch node 1202 of a Rete network 1200 from a root node 1201. The switch instructions may correspond to a unique branch node 1202 in the Rete network 1200.

In block 1104, case instructions may be mapped onto case nodes 1204 linked as sub-nodes of branch nodes 1202. The case of a switch structure corresponds to a case node 1204 whose parent is the corresponding branch node 1202 of the switch structure. In block 1106, optional default instructions may be mapped onto a particular case node 1204 of the branch node 1202. An optional otherwise structure of the switch corresponds to an otherwise case node of the corresponding switch node.

In 1108, an expression 1208 of the branch node 1204 may be determined by indexing all switch case expressions. The expression 1208 evaluated with a tuple will permit to select to which case nodes the tuple will be propagated.

In 1110, a match structure (216 in FIG. 2) may be mapped onto a branch node 1204 of a Rete network 1200 from a root node. The match instruction may correspond to a unique branch node in the Rete network.

In 1112, case instructions may be mapped onto case nodes 1204 linked as sub-nodes of branch nodes. The case of a match structure corresponds to a case node whose parent is the corresponding branch node of the match structure.

In 1114, optional default instructions may be mapped onto a particular case node 1204 of the branch node. An optional otherwise structure of the match structure corresponds to an otherwise case node of the corresponding switch node.

In 1116, an expression 1208 of the branch node may be determined by compiling the expressions (226 in FIG. 2)

from the cases (220). The expression evaluated with a tuple will permit to select to which case nodes the tuple will be propagated.

Figure 13:
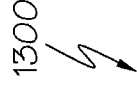
FIG. 13 is a table representing a example of a compilation of a composite production rule to a sequential program in accordance with an embodiment of the present invention.

In block 1120 an if-then-else structure 218 may be translated into a branch node 1202. In block 1122, the 'then' part 232 of the if-then-else structure can be mapped to a case node 1204. In block 1124, the 'else' part 234 can be mapped to another case node 1204. In block 1126, an expression 1208 can be compiled from the test 230 so the evaluation of this expression will permit to select to which case nodes the tuple will be propagated. As previously described, compiling a composite production rule to a sequential program is described and claimed in U.S. Pat. No. 7,809,666, entitled "Method and System for Sequential Compilation and Execution of Rules," which is incorporated herein by reference. Briefly, if-then production rules may be efficiently compiled into an evaluation tree containing tasks and loops. A condition, such as "c: Customer ( )" may be represented as a loop node. Constructs from composite production rules may be mapped to a sequential program similar to that illustrated in table 1300 in FIG. 13. FIG. 13 is a table 1300 representing an example of compilation of a composite production rule to a sequential program in accordance with an embodiment of the present invention.

Figure 14:
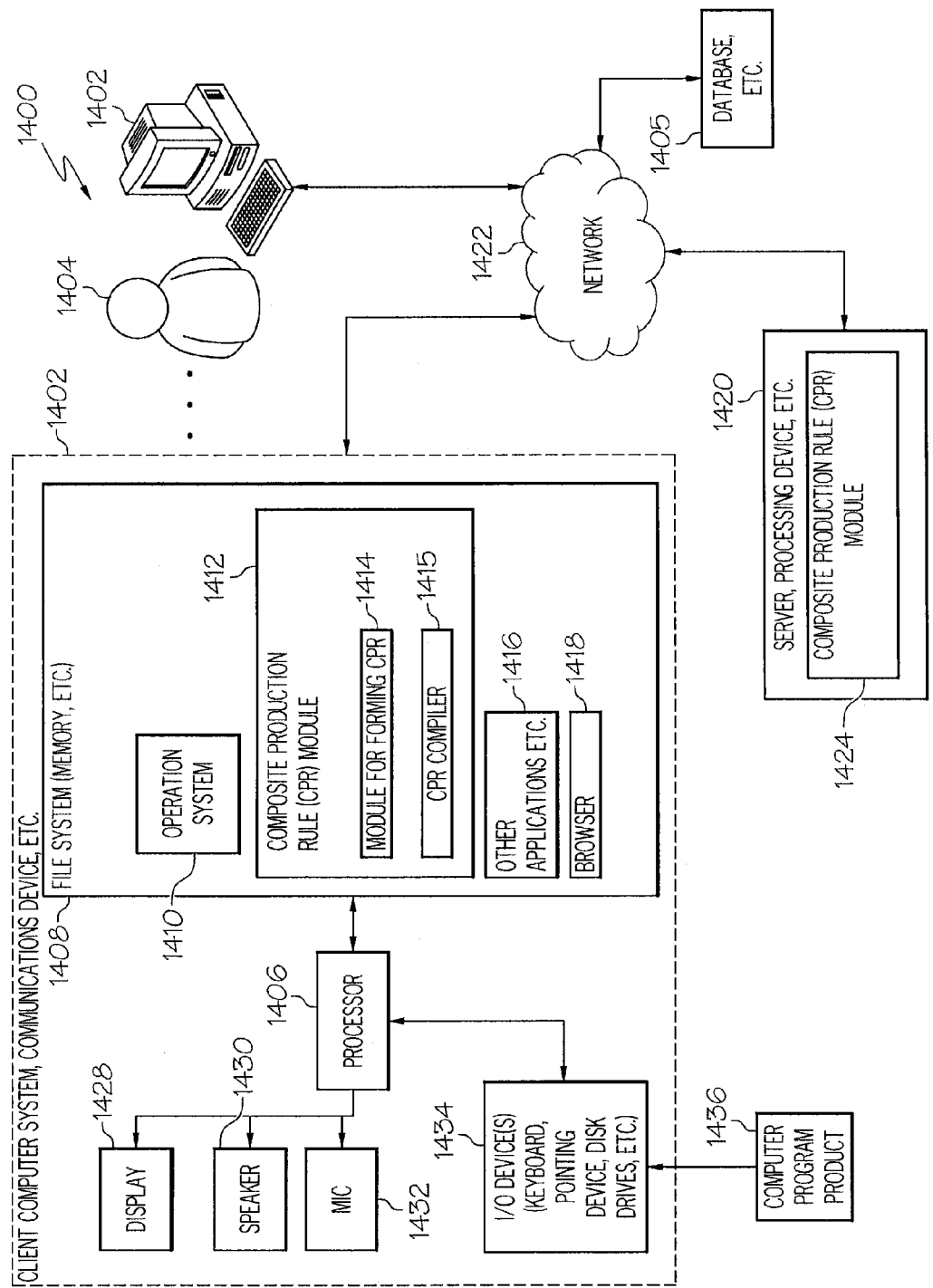
FIG. 14 is a block schematic diagram of an example of a system for forming and using a composite production rule to evaluate data and present results of the evaluation in accordance with an embodiment of the present invention.

FIG. 14 is a block schematic diagram of an example of a system 1400 for forming and using a composite production rule to evaluate data and present results of the evaluation in accordance with an embodiment of the present invention. The methods and processes described herein may be embodied in or performed by the system 1400. The system 1400 may include a computer system 1402 for use by a user 1404 for forming and using a composite production rule to obtain and evaluate data from a database 1405 or other storage device and to present results of the evaluation similar to that described herein. The computer system 1402 may be any type of computer device capable of performing the functions or operations described herein.

The computer system 1402 may include a processor 1406 to control operation of the computer system 1402 and a file system 1408, memory or similar data storage device. An operating system 1410 may be stored on the file system 1408 for running or operating on the processor 1406. A composite production rule (CPR) module 1412 may also be stored on the file system and may operate on the processor 1406 for forming and using a composite production rule to evaluate data and present results of the evaluation similar to that described herein. The methods 100, 1000, 1100 and the other procedures described herein may be embodied in the CPR module 1412 The CPR module 1412 may also include a module 1414 for forming or generating the composite production rule similar to that described herein. The CPR module 1412 may additional include a composite production rule (CPR) compiler 1415 for compiling the composite production rule on to a Rete network similar to that described with reference to FIGS. 9, 10 and 11 or a to a sequential program similar to that described in U.S. Pat. No. 7,809,666.

Other applications 1416, software programs or the like may also be stored on the file system 1408 for operation on the processor 1406. A web or Internet browser 1418 may also be stored on the file system 1418 for accessing one or more resources, such as server 1420 via a network 1422. The network 1422 may be the Internet, intranet or other network.

In accordance with an embodiment, the server 1420 or processing device may include a composite production (CPR) module 1424. The CPR module 1424 may be the same as CPR module 1412 on computer system 1402. The CPR module 1424 on the server 1420 may be provided in addition to the CPR module 1412 on the computer system 1402. In another embodiment, only the CPR module 1424 on the server 1420 may be provided, such as in a cloud computing environment or similar arrangement. The CPR module 1424 would then be accessed via the network 1422 using the browser 1418 of the computer system or computing device 402. In a further embodiment, CPR module 1412 may perform some of the operations described herein and CPR module 1424 on the server 1420 may perform other functions described herein.

The computer system 1402 may also include a display 1428 for presenting results or an output from execution of the composite production rule. The computer system 1402 may also include a speaker system 1430 for presenting any audio content. The computer system 1402 may additionally include a microphone 1432 for the user 1404 to aurally communicate via the computer system 1402.

The computer system 1402 may further include one or more input devices, output devices or combination input/output devices, collectively I/O devices 1434. The I/O devices 1434 may include a keyboard, pointing device, such as a mouse or other computer pointing device, disk drives and any other devices to permit a user, such as user 1404, to interface with and control operation of the computer system 1402 and network resources, such as server 1420. The CPR module 1414 may be loaded on the computer system 1402 from a computer program product, such as computer program product 1436 using one of the input devices 1434. The computer program product 1436 may be embodied in a form similar that previously described.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for forming and using a composite production rule, comprising:
    compiling, by a computer system, a decision table or a decision tree to generate a composite production rule;
    generating, by the computer system, the composite production rule;
    selecting, by the computer system, an algorithm for compiling the composite production rule;
    compiling, by the computer system, the composite production rule into an executable program based on pattern matching of the selected algorithm, wherein the selected algorithm for compiling the composite production rule comprises one of a Rete algorithm and a sequential program, the composite production rule being compiled to generate the sequential program for executing the composite production rule in response to the sequential program being selected and the composite production rule being compiled on a Rete network in response to the Rete algorithm being selected, the composite production rule being represented by at least a node and a case node added in a join level of the Rete network; and
    executing, by the computer system, the composite production rule to provide an output based on the composite production rule.

2. The method of claim 1, wherein compiling the decision table or the decision tree to generate a composite production rule comprises mapping the decision table or the decision tree on a single composite production rule and maintaining a logical structure of the decision table or decision tree.

3. The method of claim 1, wherein generating the composite production rule comprises generating a rule content, wherein generating the rule content comprises:
    generating a condition part;
    generating a procedural instruction; and
    generating an action content, wherein the composite production rule comprises a recursive mixing of the condition part, the procedural instruction and the action content.

4. The method of claim 1, wherein generating the composite production rule comprises generating a rule content, wherein the rule content comprises a condition part where matching variables are defined.

5. The method of claim 1, wherein generating the composite production rule comprises generating a rule content, wherein generating the rule content comprises one of:
    generating an action content;
    generating an if/then/else content, wherein the if/then/else content is adapted to evaluate a predicate expression of an if content portion of the if/then/else content, select a then content portion in response to the if content portion being true, and selecting an else content portion in response to the if content portion being false; and
    generating a switch content; and
    generating a match content.

6. The method of claim of claim 5, wherein generating the action content comprises generating a condition portion and a plurality of action statements, at least one of the plurality of action statements being performed in response to the condition portion being satisfied in a predetermined way.

7. The method of claim 5, wherein generating the if/then/else content comprises generating an if content portion, a then content portion and an else content portion, the if/then/else content further comprising a module for:
    evaluating a predicate expression of the if content portion;
    selecting the then content portion in response to the if content portion being true; and
    selecting an else content portion in response to the if content portion being false.

8. The method of claim 5, wherein generating the switch content comprises generating at least one case content, an optional default content, and a switch value, the at least one case content including a constant value and a sub-content, the switch content further comprising a module for:
    selecting the constant value in response to the at least one case content satisfying the switch value; and
    selecting the optional default content in response to the at least one case content not satisfying the switch value.

9. The method of claim 8, further comprising:
    operating in a many switch mode by the switch content in response to a plurality of case contents including overlapping constant values; and
    selecting each sub-content corresponding to each of the plurality of case contents that satisfy the switch value.

10. The method of claim 5, wherein generating the match content comprises generating a list of match cases and an optional default content, each match case comprising a sub-content and a corresponding match predicate, the method further comprising:
    selecting the sub-content of one of the list of match cases in response to the corresponding match predicate for the one of the list of match cases being satisfied;
    selecting the optional default content in response to none of the match predicates for each of the list of match cases being satisfied; and
    operating in a many match mode in response to the match predicates for the list of match cases overlapping; and
    selecting each sub-content of the list of match cases in response to the corresponding match predicate being satisfied in the many match mode.

11. The method of claim 1, further comprising translating the decision table or decision tree on a composite production rule model to generate the composite production rule and to maintain the logic structure of the decision table or decision tree in the composite production rule, wherein the composite production rule is expressed using a dedicated syntax.

12. The method of claim 1, further comprising:
    matching rule conditions of rules in a rule set to objects in a working memory of a rule engine;

creating a rule instance for each match between a matching rule condition and a corresponding object;

storing each rule instance in an agenda of the rule engine;

selecting each rule instance to be activated in a predetermined order to execute a rule action corresponding to each rule instance;

executing rule action corresponding to the rule instance in response to the rule instance being activated; and cyclically processing each rule instance in the agenda.

13. The method of claim 12, wherein executing the rule action comprises one of:

modifying the working memory by adding a new object in response to the rule action;

removing an existing object from the working memory in response to the rule action; and modifying an attribute of one of the objects in the working memory.

14. The method of claim 1, further comprising:

mapping a switch instruction onto a branch node of the Rete network for each switch instruction in the composite production rule;

mapping a case instruction onto a case node of the Rete network for each case instruction in the composite production rule, wherein each case node in linked as a sub-node of the branch node;

mapping optional default instructions onto a particular case node of a corresponding branch node; and translating an if/then/else structure into a switch case.

* * * * *